United States Patent

[11] 3,565,204

| [72] | Inventor | Robert J. Mistarz |
| | | Northbrook, Ill. |
| [21] | Appl. No. | 791,935 |
| [22] | Filed | Jan. 17, 1969 |
| [45] | Patented | Feb. 23, 1971 |
| [73] | Assignee | Chicago Stainless Equipment Corporation |

[54] COLLAPSIBLE CART
6 Claims, 2 Drawing Figs.

[52] U.S. Cl. ............................................ 180/68.5
[51] Int. Cl. ............................................ B60l 11/18
[50] Field of Search ............................................ 180/65, 19, 6.5, 6.28; 280/(WCEE), 41, 36

[56] References Cited
UNITED STATES PATENTS

| 2,429,034 | 10/1947 | Smith et al. | 280/41 |
| 2,706,008 | 4/1955 | Voigt | 180/19(S) |
| 2,798,565 | 7/1957 | Rosenthal et al. | 180/6.5 |

FOREIGN PATENTS

| 1,034,869 | 7/1966 | Great Britain | 180/19 |
| 1,043,803 | 9/1966 | Great Britain | 180/19 |

Primary Examiner—Leo Friaglia
Assistant Examiner—Milton L. Smith
Attorney—Hofgren, Wegner, Allen, Stellman & Mc Cord ABSTRACT: A wheeled battery-powered collapsible cart comprising a frame and a support means for the battery in which there is provided collapsible holding means such as a hinged bar forming a part of the frame for retaining the frame in erected position but collapsible in collapsing the cart in combination with means interconnecting the support means for the battery and the collapsible holding means so that the mass and particularly the weight of the battery holds the cart against collapsing.

PATENTED FEB 23 1971

3,565,204

INVENTOR.
ROBERT J. MISTARZ

BY Hofgren, Wegner, Allen,
Stellman & McCord.

ATTORNEYS.

COLLAPSIBLE CART

One of the features of this invention is to provide a wheeled battery-powered collapsible cart that has a support means such as a platform for the battery in which the weight of the battery on the support means holds the collapsible portion of the cart in extended or erected position.

Figure 1:
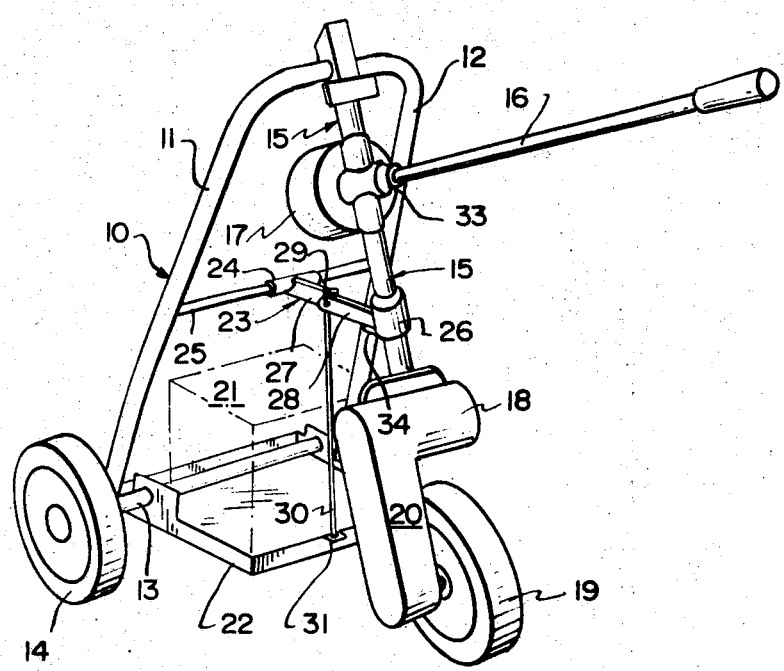
Figure 1:
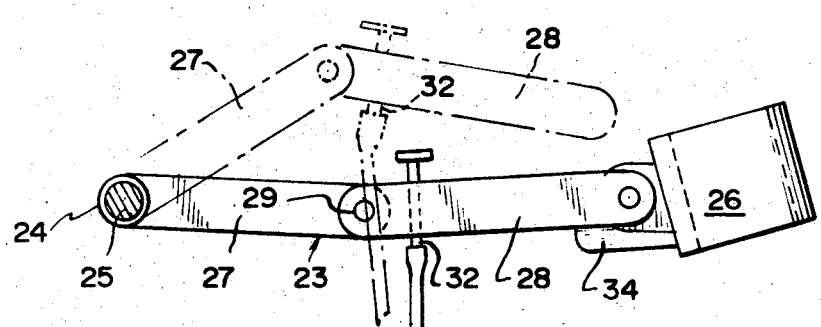
Figure 2:
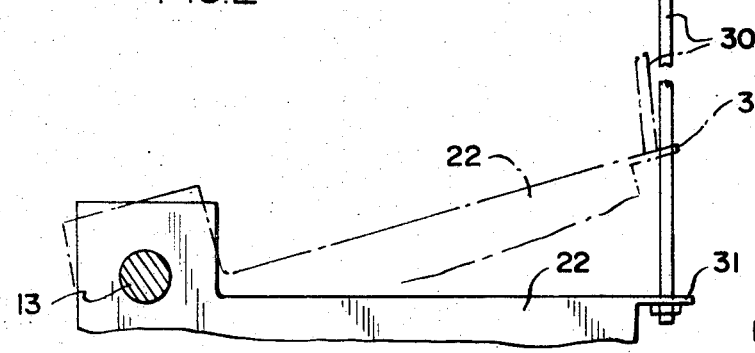

Other features and advantages of the invention will be apparent from the following description of one embodiment as illustrated in the accompanying drawings. Of the drawings:

FIG. 1 is a perspective view of a golf cart but omitting the golf bag and contents for clarity of illustration; and FIG. 2 is a detail elevational view illustrating the structure and operation of a portion of the cart.

In the illustrated embodiment the cart 10 is a three-wheeled cart for transporting a golf bag and contents which is not shown in this FIG. for clarity of illustration. The cart comprises a frame 11 in which the principal parts are an inverted U-shaped rear part 12 that carries a horizontal axle 13 and a pair of rear wheels 14 thereon and an upwardly and rearwardly inclined front part or guiding post 15. The frame parts 12 and 15 are tubular and the top of the front part 15 is hingedly connected to the top of the rear part 12 so that in collapsing the cart the two move toward each other.

The upper portion of the front part 15 of the frame carries a guiding handle 16 which is also arcuately movable about its longitudinal axis to operate a speed control within an enclosing housing 17. The handle 16 is also movable downwardly to operate the on-off switch that controls the energization of the drive motor that is within the motor housing 18. This drive motor drives the front propelling wheel 19 of the three-wheeled cart through a system of driving elements in a side housing 20. The control handle 16 and its relationship to the speed control and switch are described and claimed in my copending application Ser. No. 792,041, filed Jan. 17, 1969.

The cart is illustrated in the drawings in erected position with the collapsible frame members 12 and 15 in their normal extended positions. The cart is powered by a battery 21 which is normally supported on a movable platform 22 that is hingedly mounted on the rear axle 13. The mass of the battery 21 acting on the movable platform 22 locks the portions of the cart in extended position when the cart is erected as illustrated.

This is accomplished by providing a collapsible holding means in the form of a hinged brace 23 above the battery and the platform with this brace being rotatably attached at its rear end by means of a sleeve 24 arcuately movable on a crossbar 25 of the rear frame part 12 and hingedly connected at its front end to a collar 26 that forms a part of the front frame part 15. The brace 23 therefore in in two parts 27 and 28 hinged together at 29 that in their normal position are substantially aligned slightly below center as shown in FIG. 2 but which are capable of collapsing or hinging upwardly away from the platform 22 in collapsing the cart, as illustrated by the broken line positions of these parts in FIG. 2. Thus the brace 28 cannot move downwardly below its position shown in FIG. 2 because of stop 34 but can hinge upwardly in collapsing the cart.

Attached to the brace 23 at a point adjacent its hinge 29 is a flexible tie cable 30 that is arranged generally vertically with the lower end attached to a flange 31 at the front of the platform 22 and its upper end attached to an adjusting screw 32 mounted for vertical adjustment in the brace part 28. When the battery 21 is on the platform 22 as illustrated in FIG. 1 the mass and specifically the weight of the battery acting on the cable 30 holds the hinged brace 23 in its normal down slightly past center or locked position of FIG. 1 and the solid line position of FIG. 2. When, however, the battery 21 is removed from the platform 22 the brace 23 can be hingedly collapsed upwardly as indicated by the broken lines in FIG. 2 to rotate the platform 22 to upward extending collapsed position. At the same time the collapsing of brace 23 permits the frame parts 12 and 15 to move toward each other to their collapsed positions. In addition, the handle 16 is removable from its mounting socket 33 at the front of the unit housing 17.

Thus, as can be seen, the mass or bulk of the battery 21 used to power the cart is also used to hold the cart in its erected locked position for normal use. However, when the battery is removed the frame parts are freely collapsible for transporting or storing the cart.

I claim:

1. A wheeled battery-powered collapsible cart, comprising: a frame having members; means for hingedly connecting together said members for movement toward each other in collapsing the cart and movement away from each other in erecting the cart; collapsible holding means for retaining said hingedly connected members away from each other in extended position when the cart is erected; movable support means for said battery on said cart; and means supporting said battery and connected to said holding means and thereby operated by the mass of the battery on said support means for retaining said holding means in said extended cart erected position.

2. The cart of claim 1 wherein said support means comprises a platform and there are provided means for movably mounting said platform on said frame.

3. The cart of claim 1 wherein said collapsible holding means comprises a hinged brace as part of said frame.

4. The cart of claim 1 wherein said collapsible holding means comprises a hinged brace as part of said frame, said support means comprises a platform and there are provided means for movably mounting said platform on said frame.

5. A wheeled battery-powered collapsible cart, comprising: a frame having members; means for hingedly connecting together said members for movement toward each other in collapsing the cart and movement away from each other in erecting the cart; collapsible holding means for retaining said hingedly connected members away from each other in extended position when the cart is erected comprising a hinged brace as part of said frame, said support means comprising a platform and there are provided means for movably mounting said platform on said frame and in which said brace is positioned above said platform and collapses only upwardly away from the platform; movable support means for said battery on said cart; and means operated by the mass of the battery on said support means for retaining said holding means in said extended cart erected position.

6. The cart of claim 5 wherein said brace comprises a bar hinged intermediate its ends, and there are provided means connecting said platform to said bar whereby the weight of the battery urges the hinged bar downwardly away from its collapsed upward position and against a stop.